(12) United States Patent
Ishikawa

(10) Patent No.: US 12,307,136 B2
(45) Date of Patent: May 20, 2025

(54) IMAGE PROCESSING APPARATUS AND NON-TRANSITORY RECORDING MEDIUM

(71) Applicant: Tsuyoshi Ishikawa, Kanagawa (JP)

(72) Inventor: Tsuyoshi Ishikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/497,235

(22) Filed: Oct. 30, 2023

(65) Prior Publication Data

US 2024/0176554 A1 May 30, 2024

(30) Foreign Application Priority Data

Nov. 24, 2022 (JP) ................. 2022-187134

(51) Int. Cl.
*G06F 3/12* (2006.01)

(52) U.S. Cl.
CPC .......... *G06F 3/1204* (2013.01); *G06F 3/1208* (2013.01); *G06F 3/1256* (2013.01); *G06F 3/12* (2013.01)

(58) Field of Classification Search
None
See application file for complete search history.

(56) References Cited

U.S. PATENT DOCUMENTS

| | | | |
|---|---|---|---|
| 11,748,410 B2* | 9/2023 | Kiefer | G06F 16/31 707/741 |
| 2016/0241741 A1* | 8/2016 | Ochi | H04N 1/00469 |
| 2020/0304661 A1 | 9/2020 | Ishikawa | |

FOREIGN PATENT DOCUMENTS

| | | |
|---|---|---|
| JP | H09-006186 A | 1/1997 |
| JP | H11-174908 A | 7/1999 |
| JP | 2004-088344 A | 3/2004 |

* cited by examiner

*Primary Examiner* — Darryl V Dottin
(74) *Attorney, Agent, or Firm* — IPUSA, PLLC

(57) ABSTRACT

An image processing apparatus includes a memory that stores a minimum size of output that the image processing apparatus can output and circuitry. The circuitry is to determine a size of a document, output an image of the document in a case that the size of the document is determined to be smaller than the minimum size of the output, and output a notification prompting for confirmation in a case that the size of the document is determined not to be smaller than the minimum size of the output.

14 Claims, 11 Drawing Sheets

FIG. 5A

| ORIGINAL DOCUMENT SIZE | ORIGINAL DOCUMENT ORIENTATION | WIDTH(mm) | LENGTH(mm) |
|---|---|---|---|
| A3 | PORTRAIT | 297 | 420 |
| A4 | LANDSCAPE | 297 | 210 |
| B4 | PORTRAIT | 257 | 364 |
| B5 | LANDSCAPE | 257 | 182 |
| A4 | PORTRAIT | 210 | 297 |
| A5 | LANDSCAPE | 210 | 148 |
| B5 | PORTRAIT | 182 | 257 |
| B6 | LANDSCAPE | 182 | 128 |
| A5 | PORTRAIT | 148 | 210 |
| A6 | LANDSCAPE | 148 | 105 |
| B6 | PORTRAIT | 128 | 182 |
| B7 | LANDSCAPE | 128 | 91 |
| A6 | PORTRAIT | 105 | 148 |
| B7 | PORTRAIT | 91 | 128 |
| A7 | PORTRAIT | 74 | 105 |

FIG. 5B

| SHEET SIZE | SHEET ORIENTATION | WIDTH(mm) | LENGTH(mm) |
|---|---|---|---|
| A3 | PORTRAIT | 297 | 420 |
| A4 | LANDSCAPE | 297 | 210 |
| B4 | PORTRAIT | 257 | 364 |
| B5 | LANDSCAPE | 257 | 182 |
| A4 | PORTRAIT | 210 | 297 |
| A5 | LANDSCAPE | 210 | 148 |
| B5 | PORTRAIT | 182 | 257 |
| A5 | PORTRAIT | 148 | 210 |
| B6 | PORTRAIT | 128 | 182 |
| A6 | PORTRAIT | 105 | 148 |

IMAGE PROCESSING APPARATUS AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-187134, filed on Nov. 24, 2022, in the Japan Patent Office, the entire disclosure of which is hereby incorporated by reference herein.

BACKGROUND

Technical Field

Embodiments of the present disclosure relate to an image processing apparatus and a non-transitory recording medium.

RELATED ART

In using an image processing apparatus such as a copying machine or a multifunction peripheral having a copying function, when an operator selects the size of a sheet that is inadequate for the size of an original document set on a document table of the image processing apparatus and instructs the image processing apparatus to make a copy, there is a possibility that a blank space that is unintended occurs in the copy.

There is a technology of preventing miscopying and enabling constant formation of an image as desired by the operator without uselessly wasting a recording medium on which the image is formed. In the related art, a technology of the following configuration has been proposed. When an original document used for forming an image is set and conditions for forming the image such as a magnification ratio relating to a recording medium on which the image is to be formed and the number of recording media on which the image is to be formed are set via an operation panel, a sensor detects the size of the original document and transmits a result obtained by detecting the size of the original document. A determination function determines whether the size of the original document detected by the sensor and the conditions for forming the image set via the operation panel such as the magnification ratio relating to the recording medium and the number of recording media are coincident with the size of a recording medium, a magnification ratio relating to the recording medium, and conditions for forming an image such as the number of recording media set in advance and stored in a memory. When the determination function determines that the conditions for forming the image set via the operation panel are not coincident with the conditions for forming the image stored in the memory, a display performs display prompting for confirmation by the operator.

There is a technology of performing the display prompting the operator to confirm the conditions for forming the image to prevent miscopying when it is determined that the conditions for forming the image set via the operation panel are not coincident with the conditions for forming the image stored in the memory based on the detected size of the original document and set conditions such as a magnification ratio and designation of the recording medium.

SUMMARY

In one aspect, an image processing apparatus includes a memory that stores a minimum size of output that the image processing apparatus can output and circuitry. The circuitry is to determine a size of a document, output an image of the document in a case that the size of the document is determined to be smaller than the minimum size of the output, and output a notification prompting for confirmation in a case that the size of the document is determined not to be smaller than the minimum size of the output.

In another aspect, an image processing apparatus includes circuitry to determine a size of a document, receive a setting of a designated size of output designated by a user, output an image of the document in a case that the designated size of the output is determined to be coincident with a most suitable size of the output based on a designated magnification ratio and the size of the document, and output a notification prompting for confirmation in a case that the designated size of the output is determined not to be coincident with the most suitable size of the output.

In another aspect, a non-transitory recording medium storing a plurality of program codes which, when executed by one or more processors, causes the one or more processors to perform a method. The method includes storing a minimum size of output that an image processing apparatus can output, determining a size of a document, outputting an image of the document in a case that the size of the document is determined to be smaller than the minimum size of the output, and outputting a notification prompting for confirmation in a case that the size of the document is determined not to be smaller than the minimum size of the output.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5A is a diagram illustrating the data structure of an original document size table used for the determination of whether confirmation by an operator is required when a partial omission of an image or a blank space occurs, according to the first embodiment of the present disclosure;

FIG. 5B is a diagram illustrating the data structure of a sheet size table used for the determination of whether confirmation by an operator is required when a partial omission of an image or a blank space occurs, according to the first embodiment of the present disclosure;

Figure 1:
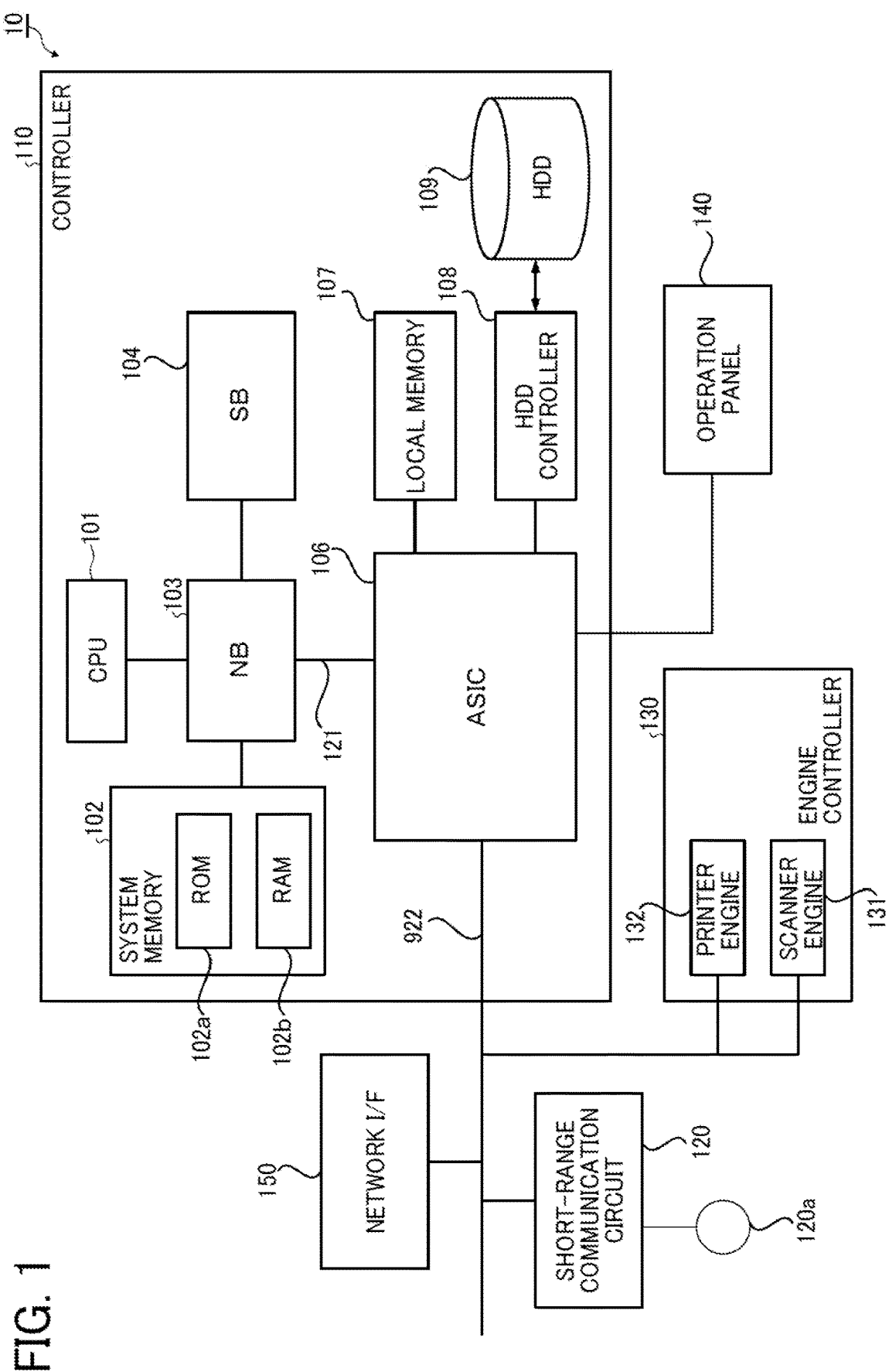
FIG. 1 is a block diagram illustrating a hardware configuration of a multifunction peripheral as an image processing apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. However, embodiments of the present disclosure are not limited to the specific embodiments described below. Thus, numerous additional modifications and variations are possible in light of the above teachings.

According to the embodiments of the present disclosure, an image processing apparatus that reduces the trouble for an operator is provided. The image processing apparatus performs notification prompts for confirmation by the operator when a partial omission of an image or a blank space that requires confirmation by the operator occurs, whereas omits to perform the notification prompting for confirmation by the operator when processing is performed for an original document whose size is determined to be smaller than the minimum size of output that can be output by the image forming apparatus to reduce the trouble for the operator. The image processing apparatus includes a determination function, a memory, an execution function, and a notification function. The determination function determines the size of an original document. The memory stores the minimum size (or minimum printable size) of output that the image processing apparatus can output. The execution function performs processing to output an image of the original document. The notification function performs notification prompting for confirmation by the operator. When the size of the original document is determined to be smaller than the minimum size of the output (condition A), the execution function performs the processing to output an image of the original document without the notification prompting for confirmation performed by the notification function. When the size of the original document is determined to be smaller than the minimum size of the output (condition A), the processing to output the image of the original document is performed without any intervention such as confirmation relating to the size of the original document and a designated size of the output. The image processing apparatus includes a confirmation necessity determination function to determine whether the notification to be performed by the notification function is required when the size of the original document is determined not to be smaller than the minimum size of the output (condition B). When the size of the original document is determined not to be smaller than the minimum size of the output (condition B), the notification may be performed by the notification function.

Preferably, the image processing apparatus further includes a setting function to receive a setting of the designated size of the output designated by the operator. When the size of the original document is determined not to be smaller than the minimum size of the output (condition B) and it is determined that a partial omission of an image or a blank space that requires confirmation by the operator occurs in the output based on at least the designated size of the output and the size of the original document (condition B-1), the notification is performed by the notification function, and the processing to output the image of the original document by the execution function is continued preferably based on an intervention of the operator in response to the notification performed by the notification function. The notification is not performed by the notification function when the size of the original document is determined not to be smaller than the minimum size of the output (condition B) and it is determined that a partial omission of an image or a blank space that requires confirmation by the operator does not occur in the output based on at least the designated size of the output and the size of the original document (condition B-2). In this case, the processing to output the image of the original document by the execution function is performed without any intervention relating to the confirmation. When the designated size of the output is determined not to be coincident with the size of the original document or when the designated size of the output is determined not to be coincident with the most suitable size of the output corresponding to a magnification ratio designated by the operator and the size of the original document, the confirmation necessity determination function determines that a partial omission of an image or a blank space that requires confirmation by the operator occurs. In some embodiments including the present embodiments, when the size of the original document is determined to be smaller than the minimum size of the output (condition A) and the magnification ratio designated by the operator indicates equal magnification or reduction (condition A-1), the processing to output the image of the original document by the execution function is performed without any intervention relating to the confirmation. On the other hand, when the magnification ratio designated by the operator indicates enlargement (condition A-2), it is determined whether a partial omission of an image or a blank space that requires confirmation by the operator occurs in the output based on at least the designated size of the output and the size of the original document. When it is determined that a partial omission of an image or a blank space that requires confirmation by the operator occurs, the notification is performed by the notification function.

According to the embodiments of the present disclosure, the image processing apparatus that further reduces the trouble for the operator is provided. The image processing apparatus performs notification prompting for confirmation by the operator when a partial omission of an image or a blank space that requires confirmation by the operator occurs, whereas omits performing the notification prompting for confirmation by the operator when it is determined that the size of a sheet different from the most suitable size of the sheet is intentionally selected to further reduce the trouble for the operator. The image processing apparatus includes the determination function, the setting function, the confirmation necessity determination function, the execution function, and the notification function. The determination function determines the size of an original document. The setting function receives a setting of a designated size of the output set by the operator. The confirmation necessity determination function determines whether the designated size of the output is coincident with the most suitable size of the output corresponding to a magnification ratio designated by the operator and the size of the original document. The execution function performs processing to output an image of the original document. The notification function performs notification prompting for confirmation by the operator. When the designated size of the output is determined to be coincident with the most suitable size of the output corresponding to a magnification ratio designated by the operator and the size of the original document, the notification function does not perform the notification prompting for confirmation and the execution function performs the processing to output the image of the original document. When the designated size of the output is determined to be coincident with the most suitable size of the output, the processing to output the image of the original document is performed without any intervention such as confirmation relating to the size of the original document and the designated size of the output. The image processing apparatus uses the notification function to perform the notification when the designated size of the output is determined not to be coincident with the most suitable size of the output.

When the designated size of the output is determined not to be coincident with the most suitable size of the output, the processing to output the image of the original document by the execution function is continued preferably based on an intervention of the operator in response to the notification performed by the notification function. On the other hand, when the designated size of the output is determined to be coincident with the most suitable size of the output, the processing to output the image of the original document by the execution function is performed without any intervention relating to the confirmation.

In the above description, when an aggregation function is designated for the original document, the determination of whether to perform the notification may be performed based on the size of the output divided according to the designation of the aggregation function. The notification may include information prompting for confirmation on the occurrence of a partial omission of an image or a blank space and other information regarding predefined resolution methods. The predefined resolution methods are, for example, defined by a designer or a manufacturer.

In the above description, the image processing apparatus is not particularly limited, but may be any apparatus that has at least one of a copying function, a scanning function, a printing function, and a facsimile communication function. The copying function forms an image obtained by reading an original document. The scanning function reads an original document and outputs the read image of the original document as an image file. The printing function forms an image of a drawn original document. The facsimile communication function transmits an original document on which image reading processing is performed or a drawn original document as an image. The determination function may determine the size of the original document by an automatic size detection function to detect the size of the original document set on the original document table or by designation of the size of the original document operated by the operator. The setting function may receive the size of the sheet associated with the sheet feeding tray designated according to designation operated by the operator as the designated size of the output designated by the operator.

According to the embodiments of the present disclosure, a program to implement the functions of the image processing apparatus is further provided.

Embodiments of the present disclosure are described below with reference to the drawings, taking a multifunction peripheral/product/printer (MFP) 10 by way of example. However, the image processing apparatus according to the present embodiments is not limited to the MFP 10.

FIG. 1 is a block diagram illustrating a hardware configuration of the MFP 10 as the image processing apparatus according to the present embodiments. As illustrated in FIG. 1, the MFP 10 includes a controller 110, a short-range communication circuit 120, an engine controller 130, an operation panel 140, and a network interface (I/F) 150.

The controller 110 includes a central processing unit (CPU) 101 as a main processor of a computer, a system memory 102, a north bridge (NB) 103, a south bridge (SB) 104, an application specific integrated circuit (ASIC) 106, a local memory 107, a hard disk drive (HDD) controller 108, and a hard disk drive (HDD) 109 as a storage area. In the controller 110, the NB 103 and the ASIC 106 are connected via an Accelerated Graphics Port (AGP) bus 121.

The CPU 101 is a controller to control the entire operation of the MFP 10. The NB 103 is a bridge to connect the CPU 101 to the system memory 102, the SB 104, and the AGP bus 121. The NB 103 includes a memory controller to control the reading from and writing to the system memory 102, a peripheral component interconnect (PCI) master, and an AGP target.

The system memory 102 includes a read-only memory (ROM) 102*a* and a random access memory (RAM) 102*b*. The ROM 102*a* stores programs and data for implementing various functions of the controller 110. The RAM 102*b* is used to load the programs and the data. The RAM 102*b* is also used as a drawing memory to store drawing data for printing. The program stored in the ROM 102*a* may be stored in any computer-readable recording medium, such as a compact disc-read only memory (CD-ROM), a compact disc-recordable (CD-R), or a digital versatile disc (DVD), in an installable or executable file format and provided as a computer program product.

The SB 104 is a bridge to connect the NB 103 to a PCI device and a peripheral device. The ASIC 106 is an integrated circuit (IC) dedicated to image processing and includes hardware elements for image processing. The ASIC 106 serves as a bridge to connect the AGP bus 121, a PCI bus 122, the HDD controller 108, and the local memory 107 to each other. The ASIC 106 includes a PCI target, an AGP master, an arbiter (ARB) as a central processor of the ASIC 106, a memory controller to control the local memory 107, a plurality of direct memory access controllers (DMACs), and a PCI unit. For example, the DMACs convert coordinates of image data with a hardware logic to rotate an image based on the image data. The PCI unit transfers data between a scanner engine 131 and a printer engine 132 through the PCI bus 122. The ASIC 106 may be connected to a universal serial bus (USB) interface, or the Institute of Electrical and Electronics Engineers 1394 (IEEE1394) interface.

The local memory 107 is a local memory used as a buffer for an image to be copied or a buffer for coding. The HDD 109 is a storage that stores image data, font data for printing, and form data. The HDD controller 108 controls the reading and writing of various data from and to the HDD 109 under the control of the CPU 101. The AGP bus 121 is a bus interface for a graphics accelerator card, which has been proposed to accelerate graphics processing. The AGP bus 121 directly accesses the system memory 102 with high throughput to accelerate the graphics accelerator card.

The short-range communication circuit 120 is provided with an antenna 120a. The short-range communication circuit 120 is a communication circuit in compliance with, for example, the near field communication (NFC) or BLUETOOTH.

The engine controller 130 includes the scanner engine 131 that performs a scanning function to read a document into an image, and the printer engine 132 that forms an image of a document. With the scanner engine 131, the engine controller 130 performs the scanning function. With the printer engine 132, the engine controller 130 performs the printing function. With the scanner engine 131 and the printer engine 132, the engine controller 130 performs a copying function including the scanning function and the printing function. The operation panel 140 includes a display panel 140a and a control panel 140b. The display panel 140a is, for example, a touch panel to display current settings or a selection screen, and receives a user input. The control panel 140b includes, for example, a numeric keypad and a start key. The numeric keypad receives assigned values of image forming parameters such as an image density parameter. The start key receives an instruction to start copying, for example. The controller 110 controls the entire operation of the MFP 10. For example, the controller 110 controls drawing, communication, and input to the operation panel 140. The scanner engine 131 or the printer engine 132 includes an image processing unit for error diffusion and gamma conversion.

The MFP 10 may sequentially switch to select a document server function, a copying function, a printing function, and a facsimile communication function by an application switching key of the operation panel 140. When the document server function is selected, an operation mode switches to a document box mode. With the selection of the copying function, the operation mode switches to a copy mode. With the selection of the printing function, the operation mode switches to a printer mode. With the selection of the facsimile communication function, the operation mode switches to a facsimile mode.

The network I/F 150 is an interface to control data communication via a communication network. The short-range communication circuit 120 and the network I/F 150 are electrically connected to the ASIC 106 via the PCI bus 122.

The hardware configuration of the MFP 10 illustrated in FIG. 1 is given by way of example. The MFP 10 does not necessarily include all of the components illustrated in FIG. 1, and may include components other than the components illustrated in FIG. 1. For example, the network I/F 150 may be a network interface card for a wired local area network (LAN), a network adapter for a wireless LAN, or a form to communicate with external devices using BLUETOOTH or a tag for NFC. Further, when a facsimile control unit (FCU) may be provided, which performs a facsimile communication function to transmit a scanned image to a destination.

The scanner engine 131 may be provided with, for example, a contact glass and an automatic document feeder, and may include a sensor to detect the size of an original document. The configuration of the printer engine 132 is not particularly limited. The printer engine 132 may be a printer employing any image forming method such as an electrophotographic method or an inkjet printing system.

The MFP 10 is provided with one or more sheet feeding trays. In the sheet feeding trays, transfer media (sheets) used for printing are set. Preferably, the MFP 10 is provided with a plurality of sheet feeding trays in which sheets of different sizes can be set. In addition, the MFP 10 may be provided with a mechanism to perform post-printing processing such as stapling processing for grouping printed matters into one bundle or punching processing for punching holes in printed matters.

Figure 2:
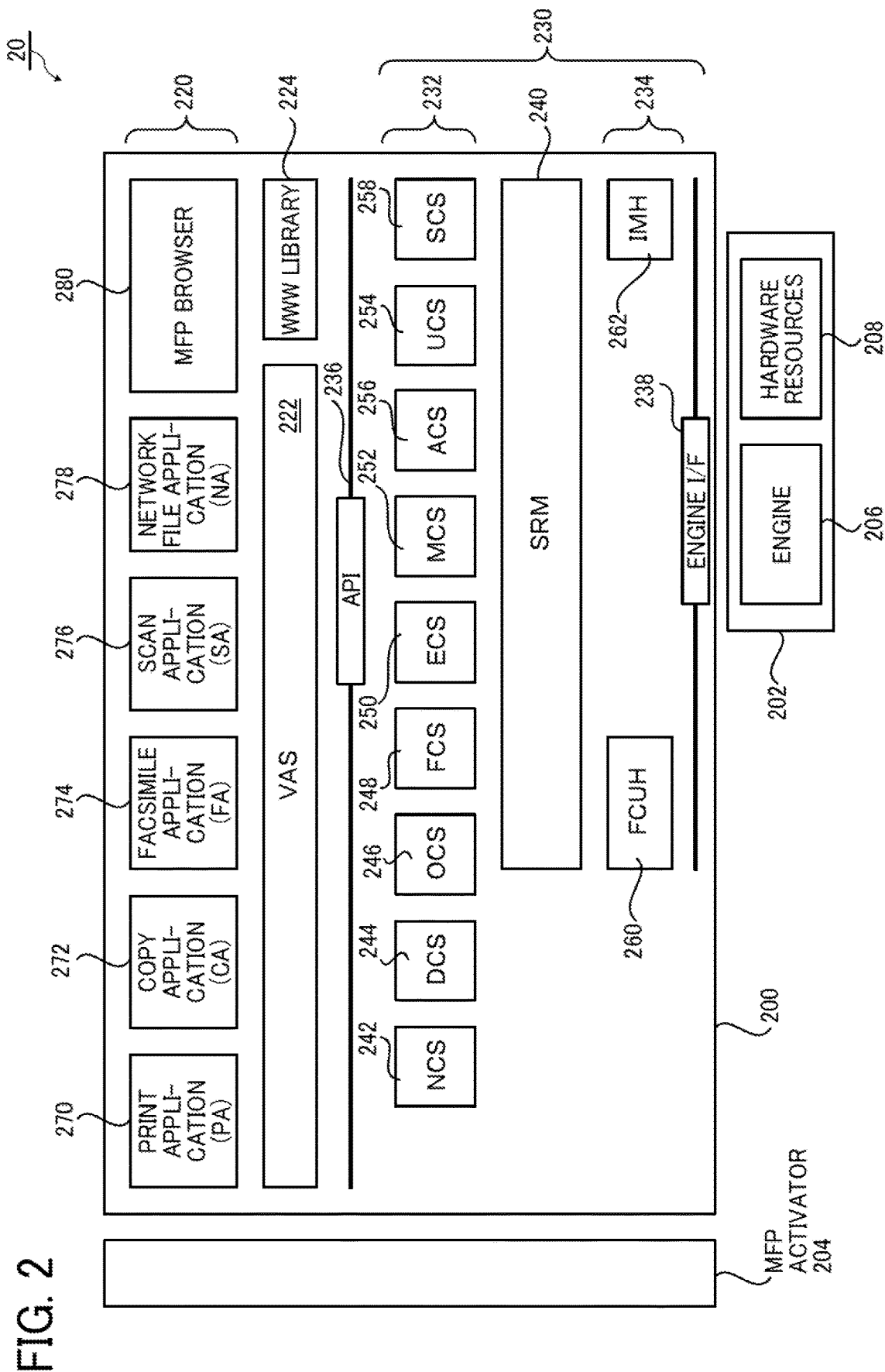
FIG. 2 is a block diagram illustrating a software and hardware configuration of a multifunction peripheral as an image processing apparatus according to embodiments of the present disclosure.

FIG. 2 is a block diagram illustrating a software and hardware configuration 20 of the MFP 10 as the image processing apparatus according to the present embodiments. The MFP 10 illustrated in FIG. 2 includes a hardware part 202 including various hardware resources, a software part 200 including various software components, and a multifunction peripheral (MFP) activator 204.

The hardware part 202 includes an engine 206 and hardware resources 208. The software part 200 includes an application layer 220, a platform layer 230, and a virtual application service (VAS) 222. The application layer 220 is formed of various applications 270, 272, 274, 276, 278, and 280 to implement functions as the MFP 10. The VAS 222 mediates the application layer 220 and the platform layer 230. The VAS 222 has a wrapping function to hide the platform layer 230 from the application layer 220, and absorbs a difference caused by a version upgrade of the platform layer 230.

The application layer 220 performs processing specific to user services relating to image formation such as printing, copying, facsimile communication, and scanning. In the configuration illustrated in FIG. 2, the application layer 220 includes a print application 270 to implement a printing function, a copy application 272 to implement a copying function, a facsimile application 274 to implement a facsimile communication function, a scan application 276 to implement a scanning function, a network file application 278 to implement a network file function, and a multifunction peripheral (MFP) browser 280.

The platform layer 230 includes a control service layer 232, a system resource management unit (SRM) 240, and a handler layer 234. The control service layer 232 interprets, together with an operating system (OS), processing requests from the print application 270, the copy application 272, the facsimile application 274, the scan application 276, the network file application 278, and the MFP browser 280, and generates acquisition requests for hardware resources. The SRM 240 manages one or more hardware resources, arbitrates the acquisition requests from the control service layer 232, and controls the execution of the acquisition requests. The handler layer 234 manages the hardware resources in accordance with the acquisition requests from the SRM 240.

As the OS, for example, UNIX can be used, but WINDOWS or any other OS can be used as well.

In the configuration illustrated in FIG. 2, the control service layer 232 includes a network control service (NCS) 242, a delivery control service (DCS) 244, an operation panel control service (OCS) 246, a facsimile control service (FCS) 248, an engine control service (ECS) 250, a memory control service (MCS) 252, an authentication control service (ACS) 256, a user information control service (UCS) 254, and a system control service (SCS) 258.

The SCS 258 manages the various applications, controls user interfaces such as display of a system screen and display of light emitting diodes (LEDs), manages the hardware resources, and controls interrupting applications. The UCS 254 manages user information. The ACS 256 controls authentication processing and processing relating to charges. The MCS 252 performs memory control such as the acquisition and release of a memory area for images, and the compression and expansion of image data.

For example, the ECS 250 controls the hardware resources such as the engine 206 and the HDD 109 to perform image reading and image forming operation, and divides the jobs received from multiple applications into processes in units of a single sheet of the original document and a single sheet of the recording medium. Moreover, the ECS 205 manages the processes, and controls the image reading and the image forming operation. The FCS 248 is connected to a General Switched Telephone Networks (GSTN) interface. The FCS 248 controls facsimile transmission and reception using a GSTN network, registration and retrieval of various data for facsimile communication stored in a backup memory, and reading for facsimile communication.

The OCS 246 controls the operation panel 140 that serves as an interface between the operator and the control of the main body. The DCS 244 controls the distribution of the documents stored in the HDD 109. The NCS 242 controls the network I/F 150 to connect the MFP 10 to ETHERNET. In addition, the NCS 242 provides services commonly available to applications that require a network interface for input and output, distributes data received, using protocols to the applications, through the network I/F 150, and mediates transmission of data received from the applications through the network I/F 150.

The software part 200 further includes an application program interface (API) 236 between the platform layer 230 and the application layer 220. The platform layer 230 receives the processing requests from the print application 270, the copy application 272, the facsimile application 274, the scan application 276, the network file application 278, and the MFP browser 280 according to predefined functions included in the API 236.

The SRM 240 performs system control and management of the hardware resources together with the SCS 258. Specifically, the SRM 240 determines whether a hardware resource requested to be acquired by an upper layer is available. When the hardware resource is available, the SRM 240 transmits a notification indicating that the hardware resource is available to the upper layer. Further, the SRM 240 schedules the use of the hardware resource in response to the acquisition request from the upper layer. For example, the SRM 240 directly controls sheet conveyance and image forming operation to be performed by the printer engine 132 of the engine 206, memory allocation, and file generation.

The handler layer 234 includes a facsimile control unit handler (FCUH) 260 and an image memory handler (IMH) 262. The IMH 262 allocates a memory to processes and manages the memory areas allocated to the processes. The SRM 240, the FCUH 260, and the IMH 262 use predefined functions included in an engine interface (I/F) 238 to transmit the processing requests to the hardware resources of the hardware part 202.

The MFP 10 uses a group of the software described above to control the hardware resources such as the engine 206, the HDD 109, and a non-volatile random access memory (NV-RAM), and provides the operator with the functions as the MFP 10 such as copying, facsimile communication, monochrome copying, and full-color copying in response to commands from the operator through a user interface and inputs from an external computer.

The MFP activator 204 operates first when the MFP 10 is turned on. The MFP activator 204 reads control programs corresponding to groups of the software (the processes) of the platform layer 230 and the application layer 220 described above from the ROM 102a, the HDD 109, and a secure digital (SD) memory card, loads the control programs onto the system memory 102 that provides a memory area for the CPU 101 to execute, and activates the processes. Thus, the above-described software and the functional units to be described later are implemented.

The above-described applications, control services, and hardware resources may be configured in various combinations. For example, an application, control service, or hardware resource may be added or any one of the above-described applications, control services, and hardware resources may be removed, depending on a particular application or a machine type. In the configuration illustrated in FIG. 2, common parts in the applications and the control services as the MFP 10 are extracted and referred to as a configuration of a platform. However, the hardware configuration and the software configuration of the MFP 10 are not particularly limited.

It is assumed that the operator (a user) selects the size of the sheet that is inadequate for the size of the original document set on the MFP 10 and the setting of the magnification ratio, and instructs the MFP 10 to make a copy. As described above, when performing the copying function, the MFP 10 preferably performs display (notification) prompting for confirmation by the operator (also referred to as warning to the operator) in order to prevent an unintended blank space or a partial omission of an image. However, when it is determined that a blank space or a partial omission of an image occurs, uniformly performing the display prompting for confirmation by the operator may be troublesome for the operator. For example, it is assumed that an image processing apparatus can detect the size of an original document smaller than the minimum printable size of a sheet. When the image processing apparatus performs a copying function for an original document whose size is smaller than the minimum printable size of a sheet with the designation of equal magnification or reduction, the size of the sheet is necessarily larger than the size of the image of the original document. However, in such a case, it may be troublesome for the operator that the image processing apparatus uniformly performs the display prompting for confirmation by the operator based on the determination that a blank space occurs. For example, in the case of copying an original document such as a business card, a driver's license, or a health insurance card, it is considered that only a small number of operators are likely to instruct copying with the designation of enlargement to eliminate a blank space. There may be a case where the operator instructs copying intentionally with a blank space. In such a case, uniformly displaying a screen prompting for confirmation by the user is troublesome for the operator.

For this reason, the image processing apparatus according to the embodiments of the present disclosure omits the notification prompting for confirmation by the operator despite the occurrence of a blank space, which is unavoidable when outputting, with the designation of equal magnification or reduction, an image of the original document whose size is smaller than the minimum printable size of the sheet. Thus, the trouble for the operator is reduced. It is assumed that a blank space occurs when an image obtained by applying the setting of the magnification ratio to the size of the original document is printed on a sheet whose size is designated by the operator. Even in such a case, when the size of the sheet designated by the operator is coincident with the most suitable size of the sheet automatically determined by a function, the image processing apparatus according to the embodiments of the present disclosure determines that the blank space is intentionally caused to occur and omits the notification prompting for confirmation by the operator. Thus, the trouble for the operator is reduced.

The image processing apparatus to perform the copy processing that can, while reducing the trouble for the operator, perform the notification prompting for confirmation by the operator when required is described in more detail below with reference to FIGS. 3 to 10. In the following description, the embodiments of the present disclosure are described on the assumption that the embodiments are applied to the copy processing as a copying function by way of example. However, the embodiments of the present disclosure are applicable not only to the copy function but also to various other functions relating to an image.

Figure 3:
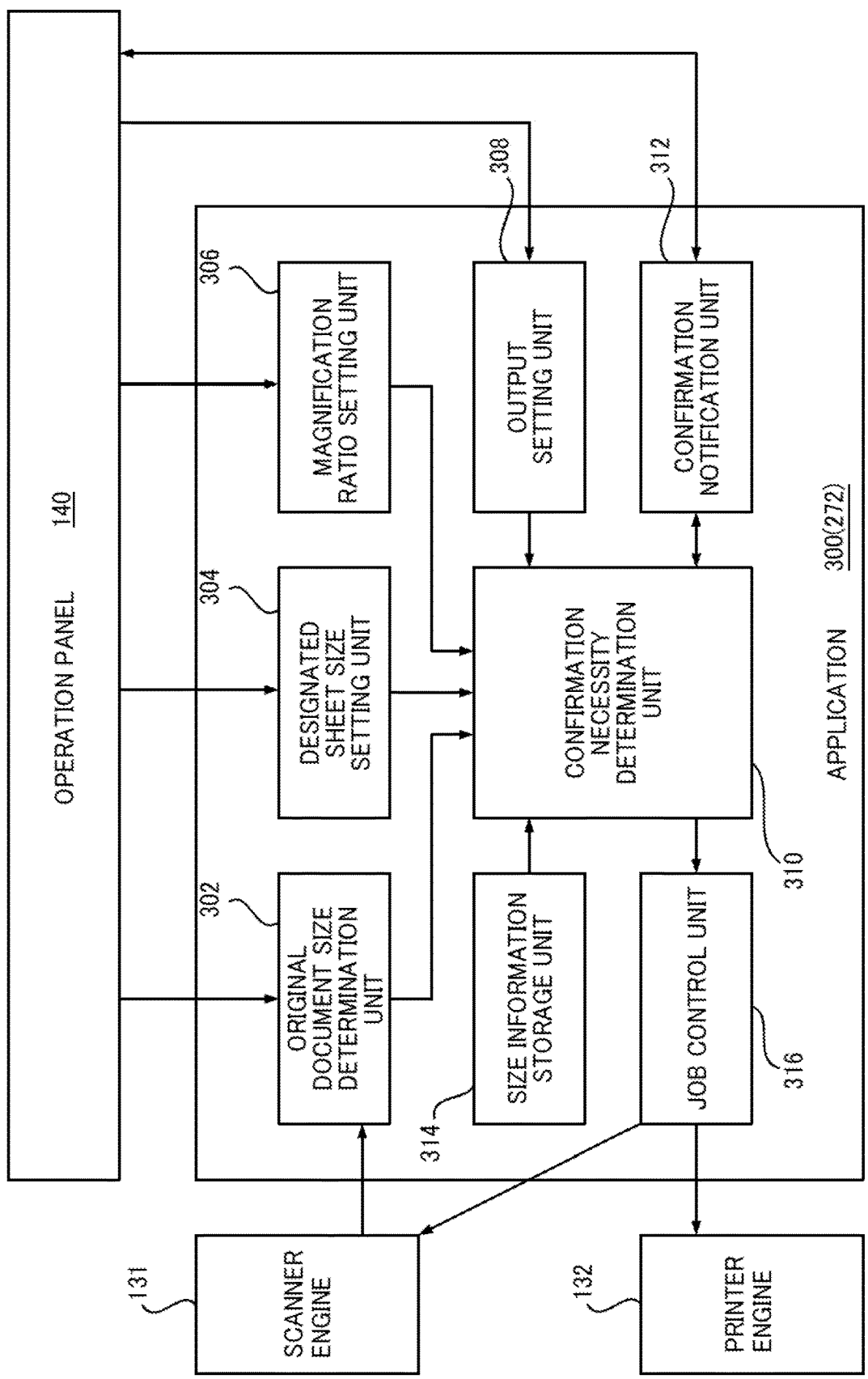
FIG. 3 is a block diagram illustrating an internal structure of an application and a configuration around the application relating to the determination of whether confirmation by an operator is required when a partial omission of an image or a blank space occurs, according to embodiments of the present disclosure.

FIG. 3 is a block diagram illustrating an internal structure of an application 300 and a configuration around the application 300 relating to the determination of whether confirmation by the operator is required when a partial omission of an image or a blank space occurs, according to the present embodiments. In FIG. 3, the operation panel 140, the scanner engine 131, and the printer engine 132 are illustrated in addition to the application 300, and an internal structure of the application 300 is also illustrated.

More specifically, the application 300 is the CA 272 illustrated in FIG. 2. Note that the description is given of the components necessary for the function relating to the determination of whether confirmation by the operator is required when a partial omission of an image or a blank space occurs in the present embodiment with reference to FIG. 3, and is not given of some components such as a general user interface (UI) controller.

As illustrated in FIG. 3, the application 300 includes, as the internal structure, an original document size determination unit 302, a designated sheet size setting unit 304, a magnification ratio setting unit 306, an output setting unit 308, a confirmation necessity determination unit 310, a confirmation notification unit 312, a size information storage unit 314, and a job control unit 316.

The magnification ratio setting unit 306 receives, from the operator via the operation panel 140, a setting of the magnification ratio for enlarging or reducing an image obtained by reading an original document and determines the magnification ratio as one of the copying conditions.

The original document size determination unit 302 determines the size of an original document to be read. Examples of the method of determining the size of an original document typically include the following two methods, but are not limited thereto. One of the methods is based on an input by the operator via the operation panel 140. In response to an input by the operator, the size of an original document is determined to be standard or irregular. The other method is to use a sensor to detect the size of an original document included in the scanner engine 131 illustrated in FIG. 1. The size of an original document is determined based on the result of the detection performed by the sensor. Both standard and irregular sizes can be detected by the sensor. The original document size determination unit 302 serves as the determination function in the present embodiments.

The designated sheet size setting unit 304 determines the size of a sheet to be used for copying in response to an input operated by the operator via the operation panel 140 to select one of the sizes of the sheets set in the sheet feeding trays. The values of the selectable sizes of the sheets may be fixed by the sheet feeding trays included in the MFP 10. Alternatively, the values of the selectable sizes of the sheets may be set at the initial settings of the MFP 10 or set directly on an application screen of the MFP 10. In either case, the values of the selectable sizes of the sheets may be changeable. The designated sheet size setting unit 304 serves as the setting function in the present embodiments.

The confirmation necessity determination unit 310 determines whether confirmation by the operator is required when a partial omission of an image or a blank space occurs. More specifically, the confirmation necessity determination unit 310 determines whether a partial omission of an image or a blank space that requires confirmation by the operator occurs in the copy to be made. When it is determined that a partial omission of an image or a blank space that requires confirmation by the operator occurs, the confirmation necessity determination unit 310 transmits, to the confirmation notification unit 312, a notification indicating that a partial omission of an image or a blank space that requires confirmation by the operator occurs in the copy to be made. As will be described in detail later, even when a partial omission of an image or a blank space occurs, there may be a case that the occurrence of the blank space is unavoidable or the operator instructs copying intentionally with the partial omission of an image or the blank space. In the present embodiments, a condition that does not require such confirmation is determined, and the display for confirmation or the determination itself is prevented or omitted. Thus, the trouble for the operator is reduced. The confirmation necessity determination unit 310 may store a table of data and a calculation formula necessary to determine whether a partial omission of an image or a blank space occurs. The confirmation necessity determination unit 310 serves as the confirmation necessity determination function in the present embodiments. The logics used by the confirmation necessity determination unit 310 for determining whether confirmation by the operator is required are described in detail in the present embodiments with reference to FIGS. 4 to 10.

When it is determined that a partial omission of an image or a blank space that requires confirmation by the operator occurs based on a result of the determination performed by the confirmation necessity determination unit 310, the confirmation notification unit 312 displays a screen prompting for confirmation by the operator on the display panel 140a of the operation panel 140 in response to the instruction from the confirmation necessity determination unit 310. In the embodiments of the present disclosure, the notification prompting for confirmation by the operator is displayed on the display panel. However, the method of the notification is not limited to display on the display panel. In another embodiment of the present disclosure, the notification prompting for confirmation by the operator may be performed, for example, by an audio message. The confirmation notification unit 312 serves as the notification function in the present embodiments.

The size information storage unit 314 stores a value of a minimum printable size of a sheet of the MFP 10. In the present embodiments, the minimum printable size of a sheet is not particularly limited, but is defined due to hardware limitations of the MFP 10. The size information storage unit 314 may store a table for determining the size of an original document and the most suitable size of a sheet.

The output setting unit 308 receives the other settings. The output setting unit 308 enables the other settings such as the post-printing processing, superimposition printing (printing additional texts or marks), and aggregation printing (printing multiple pages per sheet) when the copy processing is performed.

The job control unit 316 controls the execution of the copy processing in cooperation with the scanner engine 131 and the printer engine 132. When the notification prompting the operator to confirm the occurrence of a partial omission of an image or a blank space is performed, the job control unit 316 suspends the execution of the copy processing until receiving an intervention (such as an instruction to continue the copy processing) from the operator in response to the notification. When the notification prompting the operator to confirm the occurrence of a partial omission of an image or a blank space is omitted or prevented, the job control unit 316 continues the execution of the copy processing without receiving the intervention from the operator. The job control unit 316 serves as the execution function in the present embodiments. The print processing (image forming processing) for an original document in the copy processing is the output processing for the original document in the present embodiments.

Figure 4:
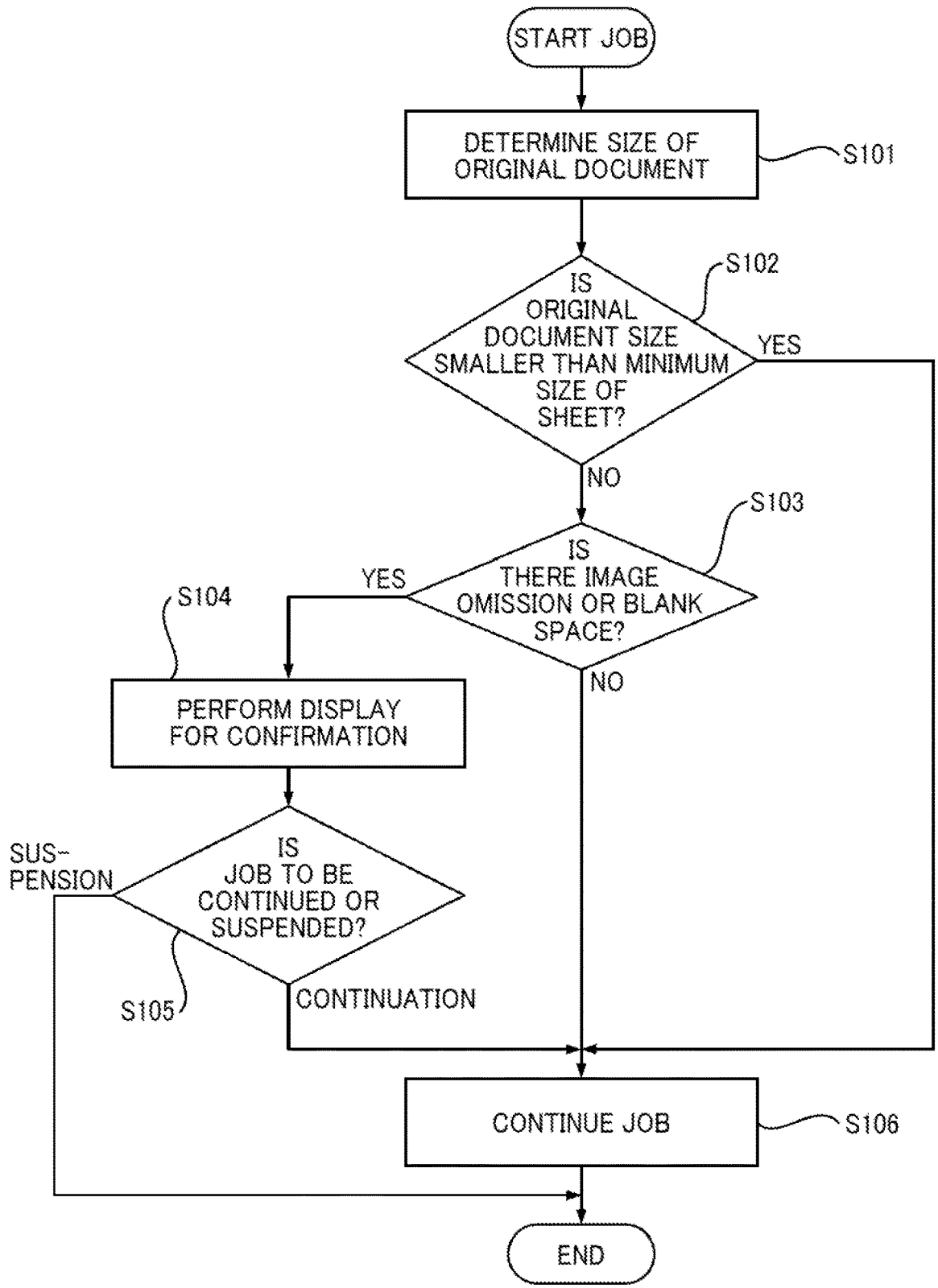
FIG. 4 is a flowchart of the processing of a copy job including the determination of whether confirmation by an operator is required when a partial omission of an image or a blank space occurs, according to the first embodiment of the present disclosure.

FIG. 4 is a flowchart of the processing of a copy job including the determination of whether confirmation by the operator is required when a partial omission of an image or a blank space occurs, according to the first embodiment. An object of the first embodiment is to reduce the trouble for the operator by omitting the notification prompting for confirmation by the operator when the copy processing is performed for an original document whose size is determined to be smaller than the above-described minimum printable size of a sheet. The processing illustrated in FIG. 4 is executed by a processor such as the CPU 101 of the MFP 10.

The processing illustrated in FIG. 4 starts in response to receiving an instruction to start processing of a copy job from the operator. In the processing of the copy job, it is assumed that the size of a sheet to be output is designated by the operator.

In step S101, the processor determines the size of an original document. Specifically, as described above, the original document size determination unit 302 illustrated in FIG. 3 is used to determine the size of the original document. The size of the original document is determined based on an input by the operator via the operation panel 140 or a result of the detection performed by the sensor to detect the size of an original document.

FIG. 5A is a diagram illustrating the data structure of an original document size table used for the determination of whether confirmation by the operator is required when a partial omission of an image or a blank space occurs, according to the first embodiment. The original document size table is a table to be used for storing the standard sizes of original documents that the MFP 10 can handle. The original document size table includes, as data items, "ORIGINAL DOCUMENT SIZE," "ORIGINAL DOCU-MENT ORIENTATION (short edge feed (SEF) or portrait, long edge feed (LEF) or landscape)," "WIDTH (mm)," and "LENGTH (mm)." A row is created in the original document size table for each of the standard sizes of the original documents that the MFP 10 can handle. In the column of the data item of the original document size, names of the standard sizes of the original documents that the MFP 10 can handle are stored. In the column of the data item of the original document orientation, parameters each indicating the orientation of the original document whether the portrait orientation or the landscape orientation are stored. This is because when the size of the original document is A4, there are two cases where the A4 size of the original document is handled in the portrait orientation and the landscape orientation. In the columns of the data items of the width and the length, the widths and the lengths of the original documents are stored, for example, in millimeters (mm). In step S101 described above, when the size of the original document is standard, the size of the original document is determined by selecting one from the original document size table illustrated in FIG. 5A.

Referring back to FIG. 4, in step S102, the processor determines whether the size of the original document determined by the original document size determination unit 302 is smaller than the minimum printable size of the sheet stored in advance. As described above, this determination is performed by the confirmation necessity determination unit 310 illustrated in FIG. 3.

FIG. 5B is a diagram illustrating the data structure of a sheet size table used for the determination of whether confirmation by the operator is required when a partial omission of an image or a blank space occurs according to the first embodiment. The sheet size table is a table to be used for storing the standard sizes of sheets that the MFP 10 can handle. Similar to the original document size table illustrated in FIG. 5A, the sheet size table includes, as data items, "SHEET SIZE," "SHEET ORIENTATION," "WIDTH (mm)," and "LENGTH (mm)." In the sheet size table, values are stored in descending order of the sizes of the sheets, for example, with the width as a primary key and the length as a secondary key. The size of the sheet that is listed in the lowermost row of the sheet size table illustrated in FIG. 5B is the minimum printable size of the sheet. As illustrated in FIGS. 5A and 5B, the sizes of the original documents that the MFP 10 can handle and the sizes of the sheets that the MFP 10 can handle are not coincident with each other in some cases. The sheet size table is stored in the size information storage unit 314. The size information storage unit 314 serves as a memory (a storing function) in the present embodiments.

Referring back to FIG. 4, in step S102, the processor refers to the minimum printable size of the sheet in the sheet size table illustrated in FIG. 5B to determine whether both the width and the length of the original document are equal to or larger than the width and the length of the minimum printable size of the sheet, respectively. In the case that both the width and the length of the original document are not equal to or larger than the width and the length of the minimum printable size of the sheet respectively, the processor determines that the size of the original document is smaller than the minimum printable size of the sheet. When the size of the original document is determined to be smaller than the minimum printable size of the sheet (YES in step S102), the processing proceeds directly to step S106.

In this case, no further determination (determination of whether a blank space occurs) is performed, and the processing proceeds to step S106. In step S106, the processor causes the job control unit 316 to continue the processing of the copy job. When the processing of copying is completed, the processing ends. When the size of the original document is determined to be smaller than the minimum printable size of the sheet, the print processing for the original document is continued to be executed without any intervention from the operator such as confirmation relating to the size of the original document.

On the other hand, when the size of the original document is determined not to be smaller than the minimum printable size of the sheet (NO in step S102), the processing proceeds to step S103. In step S103, the processor performs the processing to determine whether a partial omission of an image or a blank space occurs to further determine whether confirmation by the operator is required. In the present embodiment, the processing to determine whether a partial omission of an image or a blank space occurs is performed based on the size of the original document determined by the original document size determination unit 302 illustrated in FIG. 3 and the designated size of the sheet determined by the designated sheet size setting unit 304. In one embodiment of the present disclosure, when the designated size of the sheet determined by the designated sheet size setting unit 304 is determined not to be coincident with (determined to be different from) the size of the original document, it is determined that a partial omission of an image or a blank space that requires confirmation by the operator occurs. As described above, the determination in step S103 is also performed by the confirmation necessity determination unit 310 illustrated in FIG. 3.

When the size of the original document is determined not to be smaller than the minimum printable size of the sheet (NO in step S102) and it is determined that a partial omission of an image or a blank space that requires confirmation by the operator occurs (YES in step S103), the processing proceeds to step S104. In step S104, the processor causes the operation panel 140 to perform display for confirmation. The display for confirmation is performed by the confirmation notification unit 312.

In step S105, the processing branches depend on whether the operator instructs continuation or suspension of the processing of the copy job in response to the display for confirmation. When the continuation of the processing of the copy job is instructed in step S105 (CONTINUATION in step S105), the processing proceeds to step S106. In this case, the processing of the copy job of the original document is continued based on the intervention of continuation of the processing of the copy job instructed by the operator in response to the above-described display for confirmation. On the other hand, when the suspension of the processing of the copy job is instructed in step S105 (SUSPENSION in step S105), the processing ends without completing the processing of the copy job. In the embodiments of the present disclosure, for the sake of convenience, the processing of the copy job is suspended when the continuation of the processing of the copy job is not approved. Alternatively, a change of the settings of the copy processing may be proposed or the processing may return to a screen to allow resetting of the copy processing.

As described above, when the size of the original document is determined to be smaller than the minimum printable size of the sheet, the determination of whether a partial omission of an image or a blank space occurs is not performed, and the display for confirmation is not performed, either. As a result, the trouble for the operator is reduced when the occurrence of the blank space is unavoidable. In the first embodiment, when the size of the original document is determined not to be smaller than the minimum printable size of the sheet and it is determined that a partial omission of an image or a blank space that requires confirmation by the operator occurs in the output based on at least the designated size of the sheet and the size of the original document, necessary display for confirmation is performed and the processing of the copy job is performed in response to an intervention relating to the confirmation. When the size of the original document is determined not to be smaller than the minimum printable size of the sheet and it is determined that a partial omission of an image or a blank space that requires confirmation by the operator does not occur in the output based on at least the designated size of the sheet and the size of the original document, the display for confirmation is not performed and the processing of the copy job is performed without any intervention relating to the confirmation.

In the first embodiment described above, the display for confirmation is omitted when the size of the original document is determined to be smaller than the minimum printable size of the sheet regardless of the setting of the magnification ratio. A description is given of the second embodiment in which a logic for further determining whether confirmation by the operator is required according to the setting of the magnification ratio is implemented below with reference to FIG. 6.

Figure 6:
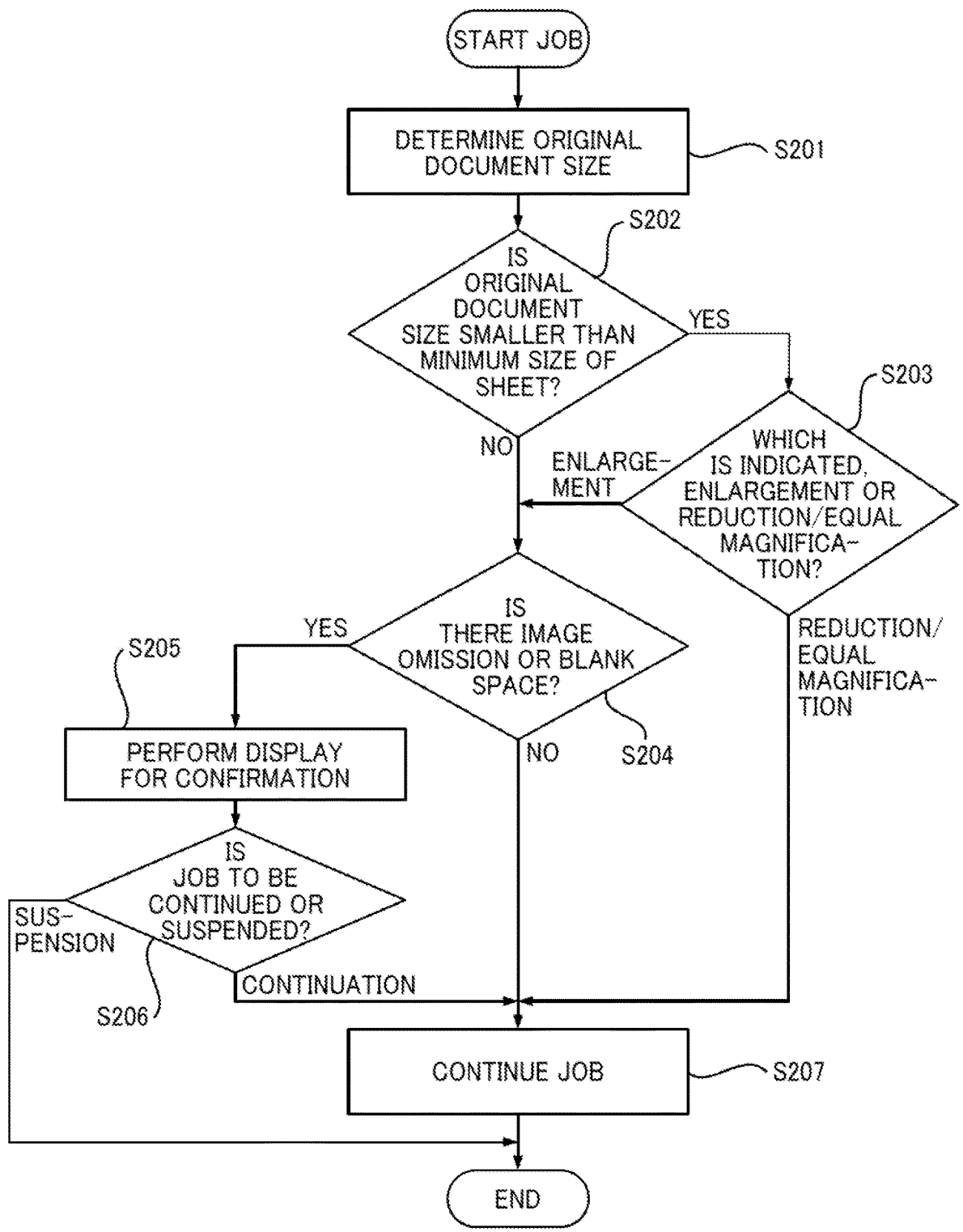
FIG. 6 is a flowchart of the processing of a copy job including the determination of whether confirmation by an operator is required when a partial omission of an image or a blank space occurs, according to the second embodiment of the present disclosure.

FIG. 6 is a flowchart of the processing of a copy job including the determination of whether confirmation by the operator is required when a partial omission of an image or a blank space occurs according to the second embodiment. An object of the second embodiment is also to reduce the trouble for the operator by omitting unnecessary display for confirmation when the copy processing is performed for an original document whose size is determined to be smaller than the above-described minimum printable size of the sheet. On the other hand, the difference from the first embodiment is that even when the size of the original document is determined to be smaller than the minimum printable size of the sheet, it is determined whether to omit the display for confirmation according to the setting of the magnification ratio.

Similar to the processing illustrated in FIG. 4 of the first embodiment, the processing illustrated in FIG. 6 starts in response to receiving an instruction to start the processing of a copy job from the operator. In the processing of the copy job, it is assumed that the setting of the magnification ratio and the designation of the size of the output are received from the operator.

In step S201, the processor determines the size of an original document. In step S202, the processor determines whether the size of the original document is smaller than the minimum printable size of the sheet. In the second embodiment, as in the first embodiment, when both the width and the length of the original document are not equal to or larger than the width and the length of the minimum printable size of the sheet respectively based on the sheet size table illustrated in FIG. 5B, the processor determines that the size of the original document is smaller than the minimum printable size of the sheet.

When the size of the original document is determined to be smaller than the minimum printable size of the sheet (YES in step S202), the processing proceeds to step S203. In step S203, the processor further determines whether the magnification ratio indicates enlargement, reduction, or equal magnification, and branches the processing based on the result of the determination. When the magnification ratio indicates reduction or equal magnification (REDUCTION or EQUAL MAGNIFICATION in step S203), as in the first embodiment, no further determination (determination of whether a blank space occurs) is performed. In step S207, the processor continues the processing of the copy job. When the processing of the copy job is completed, the processing ends. In other words, when the size of the original is determined to be smaller than the minimum printable size of the sheet and the setting of the magnification ratio set by the operator indicates equal magnification or reduction, the processing of the copy job of the original document is performed without any intervention relating to the confirmation.

On the other hand, when the magnification ratio indicates enlargement (ENLARGEMENT in step S203), the processing proceeds to step S204. When the size of the original document is determined not to be smaller than the minimum printable size of the sheet (NO in step S202), the processing also proceeds to step S204. In step S204, the processor performs the processing to determine whether a partial omission of an image or a blank space occurs to further determine whether confirmation by the operator is required. Since the processing of steps S205 to S207 is substantially the same as the processing of steps S104 to S106 illustrated in FIG. 4, descriptions thereof are omitted.

As described above, when the size of the original document is determined to be smaller than the minimum printable size of the sheet and the magnification ratio determined by the magnification ratio setting unit 306 is 100% or less (indicates equal magnification or reduction), a blank space necessarily occurs. For this reason, the display for confirmation is omitted. On the other hand, when the size of the original document is determined to be smaller than the minimum printable size of the sheet and the magnification ratio exceeds 100% (indicates enlargement), the determination of whether a partial omission of an image or a blank space that requires confirmation by the operator occurs is performed based on at least the designated size of the sheet and the size of the original document. The reason that the determination is performed is because there is a possibility that a partial omission of an image occurs.

In the first embodiment and the second embodiment, when the size of the original document is determined not to be smaller than the minimum printable size of the sheet, the further determination of whether a partial omission of an image or a blank space occurs is performed based on whether the size of the original document determined by the original document size determination unit 302 illustrated in FIG. 3 is different from the designated size of the sheet determined by the designated sheet size setting unit 304. On the other hand, as described above, even when the designated size of the sheet is differently from the size of the original document, there is a possibility that the operator has intentionally selected the size of the sheet different from the size of the original document. A description is given of the third embodiment in which the display for confirmation can be omitted when a blank space is intentionally caused to occur by such an operator below with reference to FIG. 7.

Figure 7:
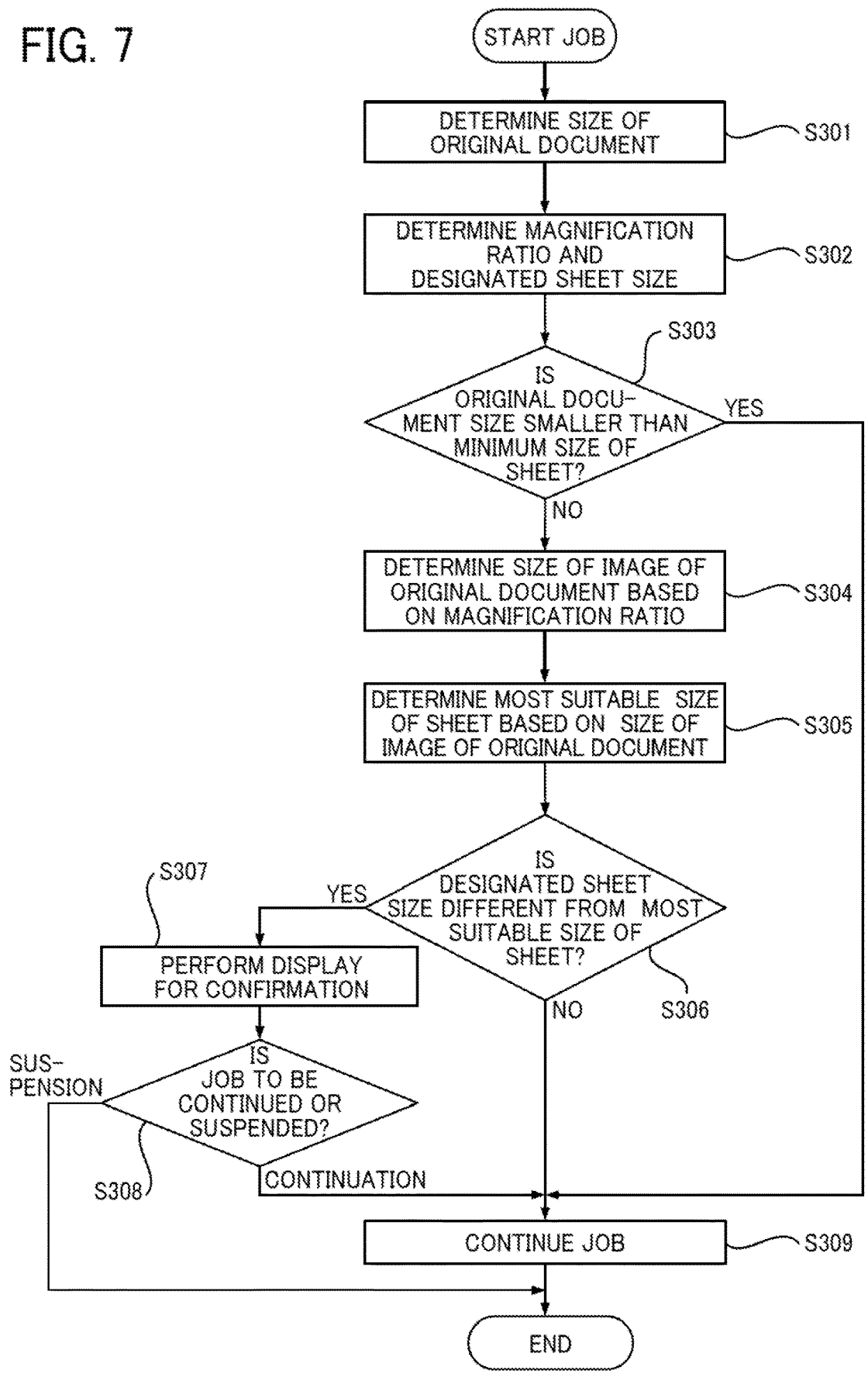
FIG. 7 is a flowchart of the processing of a copy job including the determination of whether confirmation by an operator is required when a partial omission of an image or a blank space occurs, according to the third embodiment of the present disclosure.

FIG. 7 is a flowchart of the processing of a copy job including the determination of whether confirmation by the operator is required when a partial omission of an image or a blank space occurs according to the third embodiment.

An object of the third embodiment is to reduce the trouble for the operator by omitting unnecessary display for confirmation determining that the operator intentionally causes a blank space to occur, in addition to the omission of the display for confirmation when the size of the original document is determined to be smaller than the minimum printable size of the sheet.

Similar to the processing illustrated in FIG. 4 of the first embodiment and the processing illustrated in FIG. 6 of the second embodiment, the processing illustrated in FIG. 7 starts in response to receiving an instruction to start the processing of a copy job from the operator. In step S301, the processor determines the size of an original document. The size of the original document is determined by selecting one from the original document size table illustrated in FIG. 5A. In step S302, the processor determines the magnification ratio and the designated size of the sheet. The magnification ratio is determined by the magnification ratio setting unit 306. The designated size of the sheet is determined by the designated sheet size setting unit 304. In step S303, the processor determines whether the size of the original document is smaller than the minimum printable size of the sheet.

In the case that the size of the original document is determined to be smaller than the minimum printable size of the sheet (YES in step S303), the processing proceeds to step S309. At this point, no further determination (determination of whether a blank space occurs) is performed. In step S309, the processor continues the processing of the copy job. When the processing of copying is completed, the processing ends. In the third embodiment, as in the second embodiment, the processing may branch depending on whether the magnification ratio indicates enlargement, reduction, or equal magnification.

In the case that the size of the original document is determined not to be smaller than the minimum printable size of the sheet (NO in step S303), the processing proceeds to step S304. In step S304, the processor determines, based on the magnification ratio and the size of the original document, the size of the image of the original document to which the magnification ratio is applied. In the third embodiment, the size of the image of the original document is determined by multiplying the width and the length of each of the standard sizes of the original documents listed in the original document size table or the width and the length of an irregular size of an original document by the magnification ratio determined by the magnification ratio setting unit 306 illustrated in FIG. 3.

In step S305, the processor further determines the most suitable size of a sheet based on the size of the image of the original document. The sheet size table illustrated in FIG. 5B is used for determining the most suitable size of the sheet. More specifically, the processor refers to the sizes of the sheets in the sheet size table in order from the size of the sheet in the lowermost row, and searches for the sheets whose widths and lengths are larger than the determined width and length of the image of the original document. Then, the processor determines the size of the sheet in the lowest row among the searched sheets to be the most suitable size of the sheet. In the embodiments of the present disclosure, the most suitable size of the sheet is determined by the above-described method using the sheet size table illustrated in FIG. 5B. However, there are various methods for determining the most suitable size of the sheet, and any known algorithm may be used.

In step S306, the processor determines whether the designated size of the sheet is different from the most suitable size of the sheet to further determine whether confirmation by the operator is required. The determination in step S306 is also performed by the confirmation necessity determination unit 310 illustrated in FIG. 3. When the designated size of the sheet is determined to be different from the most suitable size of the sheet (YES in step S306), the processing proceeds to step S307. In this case, it is determined that a partial omission of an image or a blank space that requires confirmation by the operator occurs. As described above, when it is determined that a blank space that is excessively large and caused by not having selected the most suitable size of the sheet or a partial omission of an image occurs, the display for confirmation is performed in step S307. On the other hand, when the designated size of the sheet is determined not to be different from (is coincident with) the most suitable size of the sheet (NO in step S306), the processing proceeds to step S309. When it is determined that a blank space that is excessively large and caused by not having selected the most suitable size of the sheet or a partial omission of an image does not occur, the display for confirmation is not performed and the processor continues the processing of the copy job.

Since the processing of steps S307 to S309 is substantially the same as the processing of steps S104 to S106 illustrated in FIG. 4, descriptions thereof are omitted.

As described above, when the designated size of the sheet designated by the operator is determined to be coincident with the most suitable size of the output calculated based on the result obtained by applying the magnification ratio determined by the magnification ratio setting unit 306, it is determined that the operator has intentionally instructed to cause a blank space or a partial omission of an image to occur and the display for confirmation is omitted. Thus, the trouble for the operator is reduced.

Figure 8:
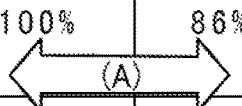
FIG. 8 is a diagram illustrating a condition for omitting confirmation by an operator when a partial omission of an image or a blank space occurs, according to the third embodiment of the present disclosure.

FIG. 8 is a diagram illustrating a condition for omitting confirmation by the operator when a partial omission of an image or a blank space occurs according to the third embodiment.

In FIG. 8, a table that indicates a magnification ratio when an image of the size of an original document specified by the row is output onto the size of the sheet specified by the column is illustrated.

It is assumed in the present embodiment that, when the magnification ratio indicates reduction, the size of the sheet is reduced to the standard size of the sheet that is next smaller than the most suitable size of the sheet. In such a case, while the magnification ratio is larger than the ratio at which the length or the width of the image of the original document perfectly fits in the standard size of the sheet that is next smaller than the most suitable size of the sheet, the display for confirmation is not required determining that the operator intentionally causes a blank space to occur. An arrow "(A)" illustrated in FIG. 8 is given by way of example. When the size of the original document is A3 and the magnification ratio is 99%, the most suitable size of the sheet is the A3 size of the sheet in which a partial omission of an image does not occur and the smallest blank space occurs, and the standard size of the sheet that is next smaller than the most suitable size of the sheet is the B4 size of the sheet. As a result, as long as the A3 size of the sheet is selected as the designated size of the sheet, the display for confirmation is not performed at the magnification ratio from 100% to 87% determining that the blank space is intentionally caused to occur by the operator.

It is assumed that the magnification ratio indicates enlargement and is enlarged to a ratio corresponding to the standard size of the sheet that is next smaller than the most suitable size of the sheet. While the magnification ratio is larger than the ratio at which the length or the width of the image of the original document perfectly fits in the standard size of the sheet that is next smaller than the most suitable size of the sheet, the display for confirmation is not required determining that the operator intentionally causes a blank space to occur. An arrow "(B)" illustrated in FIG. 8 is given by way of example. When the size of the original document is A4 and the magnification ratio is 105%, the most suitable size of the sheet is the B4 size of the sheet in which a partial omission of an image does not occur and the smallest blank space occurs, and the standard size of the sheet that is next smaller than the most suitable size of the sheet is the A4 size of the sheet. As a result, as long as the B4 size of the sheet is selected as the designated size of the sheet, the display for confirmation is not performed at the magnification ratio from 122% to 101% determining that the blank space is intentionally caused to occur by the operator.

In the above-described embodiments, the description is given based on the standard sizes of the original documents. However, the method is applicable not only to the standard sizes of the original documents but also to any irregular size of an original document. In the third embodiment, the display for confirmation is not performed within a certain range of the magnification ratio obtained as a result of the comparison between the width and the length of the original document and the width and the length of the sheet. Alternatively, the determination may be performed by focusing on the magnification ratio, in place of using the comparison with the width and the length of the sheet.

In the first to third embodiments described above, when the determination of whether the size of the original document is smaller than the minimum printable size of the sheet is performed and the size of the original document is determined to be smaller than the minimum printable size of the sheet, the display for confirmation is omitted. On the other hand, when the designated size of the sheet designated by the operator is determined to be coincident with the most suitable size of the output calculated based on the result obtained by applying the magnification ratio determined by the magnification ratio setting unit 306, it is determined that the operator has intentionally instructed to cause a blank space or a partial omission of an image to occur and the display for confirmation may simply be omitted. A description is given of the fourth embodiment in which the display for confirmation is omitted only when a blank space is intentionally caused to occur by such an operator below with reference to FIG. 9.

Figure 9:
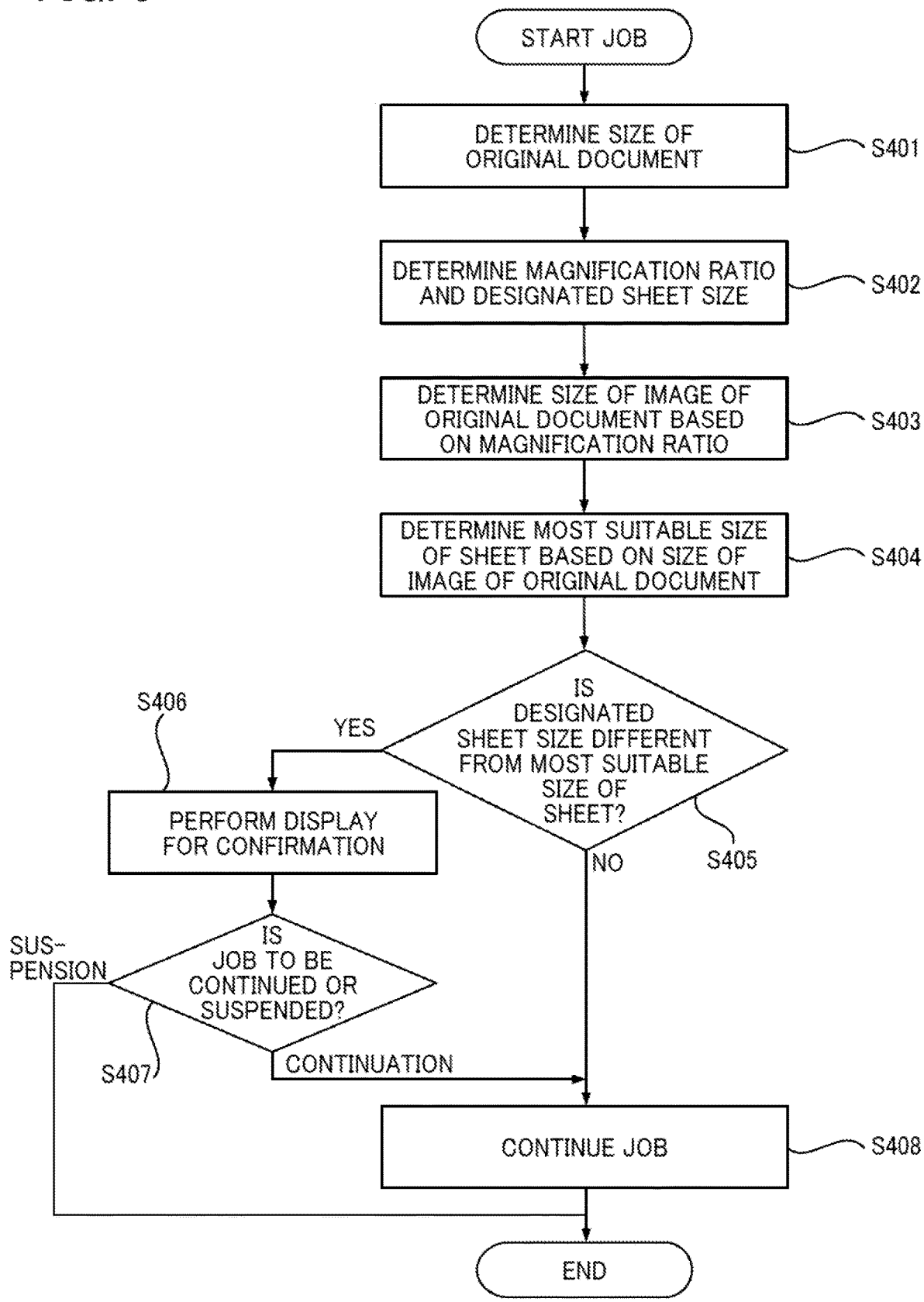
FIG. 9 is a flowchart of the processing of a copy job including the determination of whether confirmation by an operator is required when a partial omission of an image or a blank space occurs, according to the fourth embodiment of the present disclosure.

FIG. 9 is a flowchart of the processing of a copy job including the determination of whether confirmation by the operator is required when a partial omission of an image or a blank space occurs according to the fourth embodiment.

An object of the fourth embodiment is also to reduce the trouble for the operator. In the fourth embodiment, the determination regarding the minimum printable size of the sheet is not performed, whereas unnecessary display for confirmation is omitted determining that the operator intentionally causes a blank space to occur.

Similar to the processing illustrated in FIG. 4 of the first embodiment, the processing illustrated in FIG. 6 of the second embodiment, and the processing illustrated in FIG. 7 of the third embodiment, the processing illustrated in FIG. 9 starts in response to receiving an instruction to start the processing of a copy job from the operator. In step S401, the processor determines the size of an original document. In step S402, the processor determines the magnification ratio and the designated size of the sheet. In step S403, the processor determines, based on the magnification ratio and the size of the original document, the size of the image of the original document to which the magnification ratio is applied. In step S404, the processor further determines the most suitable size of a sheet based on the size of the image of the original document.

In step S405, the processor determines whether the designated size of the sheet is different from the most suitable size of the sheet to determine whether confirmation by the operator is required. When the designated size of the sheet is determined to be different from the most suitable size of the sheet (YES in step S405), the processing proceeds to step S406. In this case, it is determined that a partial omission of an image or a blank space that requires confirmation by the operator occurs. As described above, when it is determined that a blank space that is excessively large and caused by not having selected the most suitable size of the sheet or a partial omission of an image occurs, the display for confirmation is performed in step S406. In this case, the processing of the copy job of the original document is continued based on an intervention of continuation of the processing of the copy job instructed by the operator in response to the above-described display for confirmation.

On the other hand, when the designated size of the sheet is determined not to be different from (is coincident with) the most suitable size of the sheet (NO in step S405), the processing proceeds to step S408. When it is determined that a blank space that is excessively large and caused by not having selected the most suitable size of the sheet or a partial omission of an image does not occur, the display for confirmation is not performed and the processor continues the processing of the copy job without any intervention relating to the confirmation. Since the processing of steps S406 to S408 is substantially the same as the processing of steps S104 to S106 illustrated in FIG. 4, descriptions thereof are omitted.

As described above, when the designated size of the sheet designated by the operator is determined to be coincident with the most suitable size of the output calculated based on the result obtained by applying the magnification ratio determined by the magnification ratio setting unit 306, it is determined that the operator has intentionally instructed to cause a blank space or a partial omission of an image to occur and the display for confirmation is omitted. Thus, the trouble for the operator is reduced. On the other hand, the determination of whether the size of the original document is smaller than the minimum printable size of the sheet may be omitted.

In the above-described embodiments, the descriptions are given in the case that the aggregation function is not set. As described above, in the processing of a copy job, the aggregation function such as two-in-one or four-in-one is set in some cases. The aggregation function is a function to collectively output multiple images of one or more original documents onto one sheet. The aggregation function allows multiple images of one or more original documents such as two, four, eight, or sixteen images to be aggregated onto one sheet. When such an aggregation function is used, the determination may be performed using values obtained by dividing the width and the length of the sheet selected by the designated sheet size setting unit 304 of FIG. 3 in response to an operation performed by the operator by n and m (n and m are values corresponding to the setting of the aggregation function), respectively. For example, in the case of the two-in-one, either the width or the length of the sheet is divided by two. As another example, in the case of the four-in-one, both the width and the length of the sheet are divided by two. When the number of images of the one or more original documents does not reach a predetermined number (for example, four in the case of the four-in-one) and an area divided for aggregation is not filled, the area not filled is determined not to be a blank space.

As described above, when the setting of the aggregation function for the original document is designated, the determination of whether to perform the display for confirmation is performed based on the size of the output divided according to the designation of the setting of the aggregation function. In the first and second embodiments described above, the processing relating to the aggregation function is not necessarily performed.

In the first to fourth embodiments described above, the display for confirmation simply indicates the occurrence of a partial omission of an image or a blank space to inform the operator thereof. In some embodiments including the present embodiments, the display for confirmation may indicate not only the occurrence of a partial omission of an image or a blank space but also a resolution method for preventing the occurrence of the partial omission of an image or the blank space.

Figure 10A:
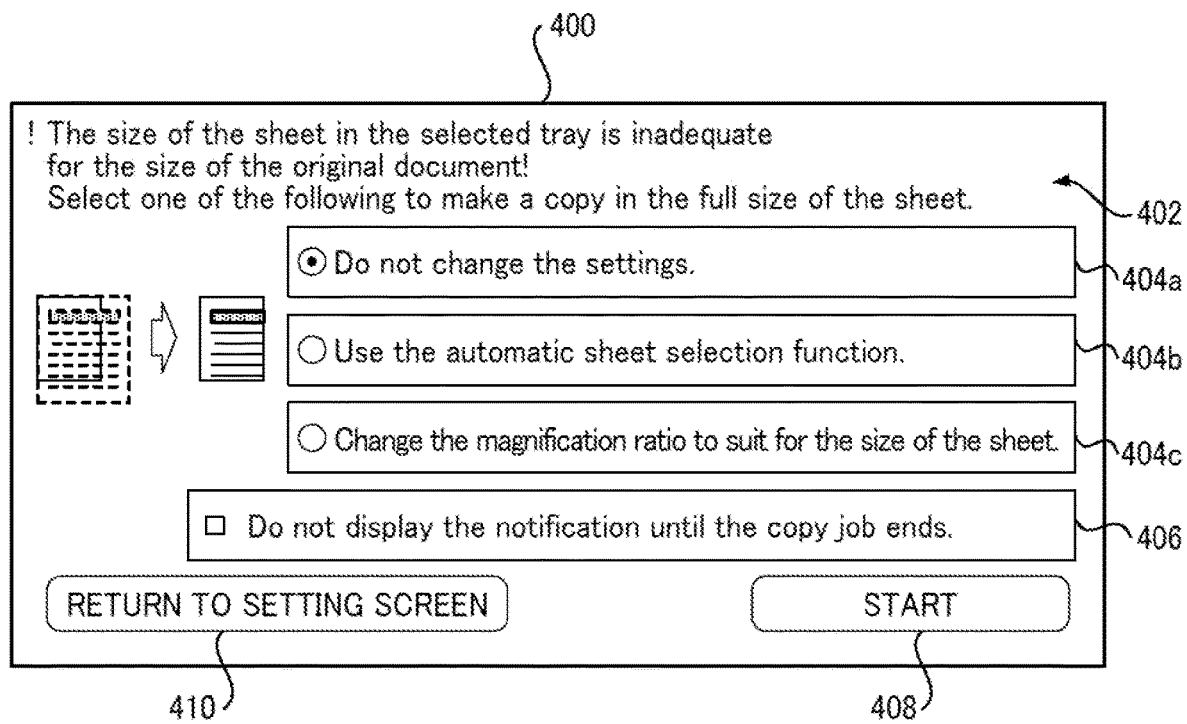
FIGS. 10A and 10B are diagrams each illustrating a confirmation notification screen displayed on an operation panel of a multifunction peripheral when a partial omission of an image or a blank space occurs, according to the fourth embodiment of the present disclosure.
Figure 10B:
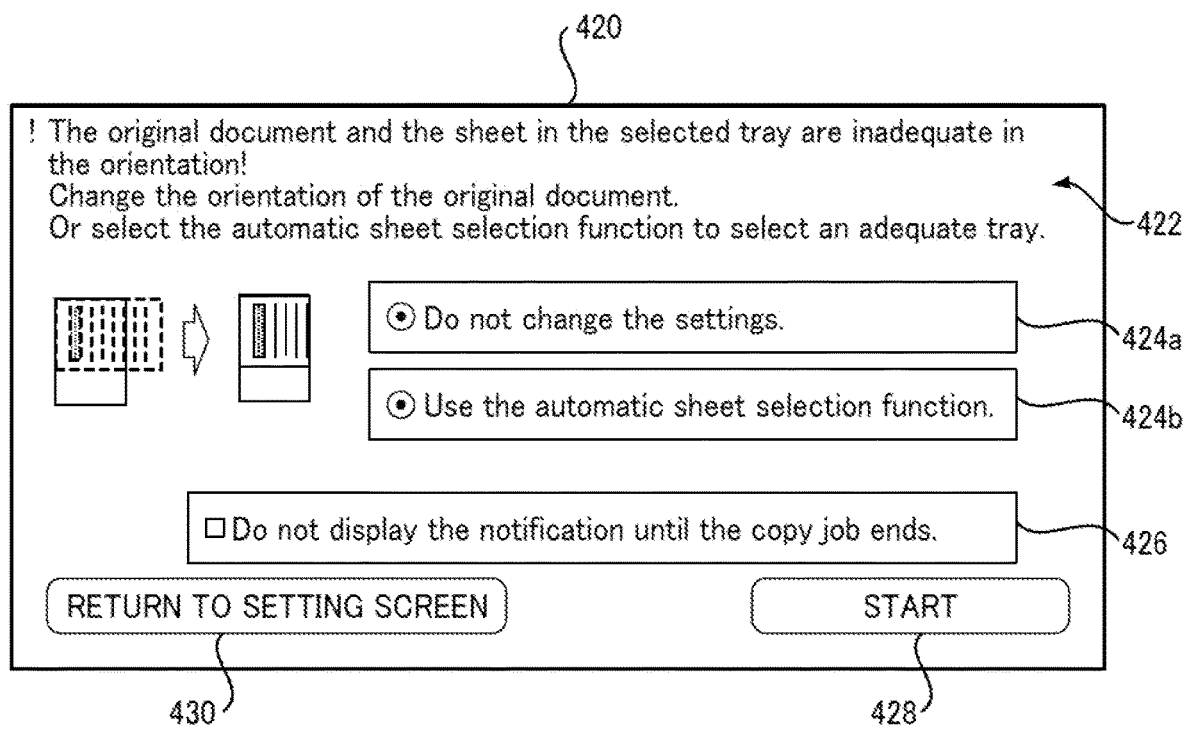

FIGS. 10A and 10B are diagrams each illustrating a confirmation notification screen displayed on the operation panel 140 of the MFP 10 when a partial omission of an image or a blank space occurs according to the fourth embodiment.

A confirmation notification screen 400 illustrated in FIG. 10A is a screen to present the display for confirmation when an original document and a sheet in a sheet feeding tray selected by the operator are adequate in orientation but inadequate in size. For example, the case of the processing illustrated in FIG. 4 of the first embodiment corresponds to such a case. In the case of the processing illustrated in FIG. 4, the size of the original document is determined not to be smaller than the minimum printable size of the sheet and the original document and the sheet of the minimum printable size are adequate in the orientation but the designated size of the sheet is inadequate for the size of the original document, and therefore a blank space occurs. The confirmation notification screen 400 illustrated in FIG. 10A includes a message 402, radio buttons 404a to 404c, a button 406, a start key 408, and a return to setting screen button 410. The message 402 indicates that the size of the sheet in the sheet feeding tray selected by the operator is inadequate for the size of the original document. The button 406 receives an instruction not to display the confirmation notification screen again until the processing of the copy job ends under the selected conditions.

The start key 408 receives an instruction to continue the copy processing with or without changing the settings of the copy processing. The return to setting screen button 410 receives an instruction to suspend the processing of the copy job and restart the processing of the copy job from the settings. The radio button 404a receives a selection not to change the settings. When the radio button 404a is pressed to receive a selection not to change the settings and the start key 408 is pressed, the processing of the copy job is continued without the change of the settings. The radio button 404b receives a selection to use the automatic sheet selection function to select the size of the sheet. When the radio button 404b is pressed to receive a selection to use the automatic sheet selection function and the start key 408 is pressed, the setting of "the size of the sheet" among the settings of the copy processing is changed to "the automatic sheet selection function" and the processing of the copy job is performed. The radio button 404c receives a selection to change the magnification ratio to suit the size of the sheet. When the radio button 404c is pressed to receive a selection to change the setting of the magnification ratio to suit for the size of the sheet and the start key 408 is pressed, the setting of "the magnification ratio" among the settings of the copy processing is changed to the automatic magnification ratio setting function that automatically changes the magnification ratio to suit for the designated size of the sheet and the processing of the copy job is performed.

A confirmation notification screen 420 illustrated in FIG. 10B is a screen to present the display for confirmation when an original document and a sheet in a sheet feeding tray selected by the operator are adequate in size but inadequate in orientation. For example, the case of the processing illustrated in FIG. 4 of the first embodiment corresponds to such a case. In the case of the processing illustrated in FIG. 4, the size of the original document is determined not to be smaller than the minimum printable size of the sheet and the designated size of the sheet is adequate for the size of the original document but the original document and the sheet are inadequate in the orientation, and therefore a blank space occurs. The confirmation notification screen 420 illustrated in FIG. 10B includes a message 422, a radio button 424*a*, a radio button 424*b*, a button 426, a start key 428, and a return to setting screen button 430. The message 422 indicates that the original document and the sheet in the sheet feeding tray selected by the operator are inadequate in the orientation. The radio button 424*a* receives a selection not to change the settings. The radio button 424*b* receives a selection to use the automatic sheet selection function to select the size of the sheet. The button 426 receives an instruction not to display the confirmation notification screen again until the processing of the copy job ends under the selected conditions. The return to setting screen button 430 receives an instruction to suspend the processing of the copy job and restart the processing of the copy job from the settings.

As described above, the MFP 10 according to the present embodiments provides the following advantageous effects:
  (A) The MFP 10 presents the most suitable size of the sheet determined by the MFP 10 and prompts for the setting of the most suitable size of the sheet in the sheet feeding tray;
  (B) The MFP 10 presents the most suitable size of the sheet determined by the MFP 10, and when the most suitable size of the sheet is set in another sheet feeding tray, prompts for the use of the sheet in the other sheet feeding tray;
  (C) The MFP 10 prompts for the change of the magnification ratio;
  (D) The MFP 10 prompts for the use of the automatic sheet selection function that the MFP 10 has;
  (E) The MFP 10 prompts for the use of the automatic magnification ratio setting function that automatically changes the magnification ratio to suit the designated size of the sheet; and
  (F) When the magnification ratio indicates equal magnification and the orientation of the sheet selected by the operator is different from the orientation of the original document merely by 90 degrees, the MFP 10 prompts for the replacement of the original document.

As described above, the display for confirmation may include information prompting the operator to confirm the occurrence of a partial omission of an image or a blank space and other information regarding predefined resolution methods.

As described above, according to the embodiments of the present disclosure, the following image processing apparatus and program are provided. The image processing apparatus performs the notification prompting for confirmation by the operator when confirmation by the operator is required, whereas omits the notification prompting for confirmation by the operator when the copy processing is performed for an original document whose size is determined to be smaller than the minimum printable size of a sheet. The program implements the functions of the image processing apparatus. Thus, the trouble for the operator is reduced.

According to the embodiments of the present disclosure, the following image processing apparatus and program are provided. The image processing apparatus performs the notification prompting for confirmation by the operator when confirmation by the operator is required, whereas omits the notification prompting for confirmation by the operator when it is determined that the operator has intentionally instructed to cause a blank space to occur. The program implements the functions of the image processing apparatus. Thus, the trouble for the operator is reduced.

In particular, according to the first to third embodiments described above, when the occurrence of a blank space is unavoidable, for example, in the case that the size of the original document is determined to be smaller than the minimum printable size of a sheet of the image processing apparatus, the image processing apparatus prevents or omits the notification prompting for confirmation by the operator. Thus, the trouble for the operator is reduced.

In particular, according to the third and fourth embodiments described above, when it is determined that the operator has intentionally instructed to cause a blank space to occur, the image processing apparatus prevents or omits the notification prompting for confirmation by the operator. Thus, the trouble for the operator is reduced.

As described above, the embodiments of the present disclosure have been described on the assumption that the output processing for an original document is a copying function that is the print processing for the original document in the copy processing. However, the embodiments of the present disclosure are applicable not only to the copy function but also to various other functions. For example, in the case of the copy function, as described above, the size of the original document is the size of an image obtained by reading the original document, the minimum size of output and the designated size of output are the minimum printable size of a sheet on which the MFP 10 can print the image and the designated size of a sheet on which the MFP 10 can print the image respectively, and the output processing is processing to print the image of the original document in the copy processing. When the embodiments of the present disclosure are applied to a scanning function, the size of the original document is the size of an image obtained by reading the original document, the minimum size of output and the designated size of output are the minimum size of an image that the MFP 10 can output as an image file and the designated size of an image that the MFP 10 can output as an image file respectively, and the output processing is processing to store the image file of the original document in the scan processing. When the embodiments of the present disclosure are applied to a printing function, the size of the original document is the size of an image of the original document drawn by the printer driver, the minimum size of output and the designated size of output are the minimum printable size of a sheet on which the MFP 10 can print the image and the designated size of a sheet on which the MFP 10 can print the image respectively, and the output processing is processing to print the image of the original document in the print processing. When the embodiments of the present disclosure are applied to a facsimile communication function, the size of the original document is the size of an image obtained by reading the original document or the size of an image of the original document drawn by the driver, the minimum size of output and the designated size of output are the minimum size of an image that the MFP 10 can transmit by facsimile communication and the designated size of an image that the MFP 10 can transmit by facsimile communication respectively, and the output processing is processing to transmit the image of the original document by facsimile communication in the facsimile transmission processing.

Each of the functions of the above-described embodiments may be implemented by one or more processing circuits or circuitry. The "processing circuit or circuitry" herein includes a programmed processor to execute each function by software, such as a processor implemented by an electronic circuit, and devices, such as an application specific integrated circuit (ASIC), a digital signal processor (DSP), a field programmable gate array (FPGA), and circuit modules known in the art arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image processing apparatus comprising:
a memory that stores a minimum size of output that the image processing apparatus can output; and
circuitry configured to:
determine a size of a document;
output an image of the document in a case in which the size of the document is determined to be smaller than the minimum size of the output;
output a notification prompting for confirmation in a case in which the size of the document is determined not to be smaller than the minimum size of the output;
receive a setting of a designated size of output designated by a user; and
in the case that the size of the document is determined not to be smaller than the minimum size of the output, output the notification based on a determination that a partial omission of the image or a blank space occurs based on at least the designated size of the output and the size of the document.

2. The image processing apparatus according to claim 1, wherein,
the circuitry is configured not to output the notification in the case in which the size of the document is determined not to be smaller than the minimum size of the output, based on a determination that a partial omission of the image or a blank space does not occur based on at least the designated size of the output and the size of the document.

3. The image processing apparatus according to claim 1, wherein the circuitry is configured to
determine that a partial omission of the image or a blank space occurs in a case in which the designated size of the output is determined not to be coincident with the size of the document.

4. The image processing apparatus according to claim 1, wherein the circuitry is configured to
determine that a partial omission of the image or a blank space occurs in a case in which the designated size of the output is determined not to be coincident with a most suitable size of the output corresponding to a designated magnification ratio and the size of the document.

5. The image processing apparatus according to claim 1, wherein the circuitry is configured to:
in a case in which the size of the document is determined to be smaller than the minimum size of the output,
output the image of the document without any intervention relating to the confirmation in a case in which a magnification ratio designated by the user indicates equal magnification or reduction; and
output the notification based on a determination that a partial omission of the image or a blank space occurs in a case in which the magnification ratio designated by the user indicates enlargement.

6. The image processing apparatus according to claim 1, wherein,
in a case in which a setting of an aggregation function is designated for the document, the circuitry is further configured to determine whether to output the notification based on a size of output divided according to designation of the setting of the aggregation function.

7. The image processing apparatus according to claim 1, wherein,
the notification includes a message prompting for confirmation on an occurrence of a partial omission of the image or a blank space, and information on a predefined resolution method.

8. The image processing apparatus according to claim 1, wherein,
the image processing apparatus has at least one of a copying function to form an image obtained by reading a document, a scanning function to read a document and output a read image of the document as an image file, a printing function to form an image of a document, a facsimile communication function to transmit an image of a document.

9. An image processing apparatus comprising circuitry configured to:
determine a size of a document;
receive a setting of a designated size of output designated by a user;
output an image of the document in a case in which the designated size of the output is determined to be coincident with a most suitable size of the output based on a designated magnification ratio and the size of the document; and output a notification prompting for confirmation in a case in which the designated size of the output is determined not to be coincident with the most suitable size of the output.

10. The image processing apparatus according to claim 9, wherein, the circuitry is configured to:

output the image of the document based on an intervention of the user in response to the notification in the case in which the designated size of the output is determined not to be coincident with the most suitable size of the output; and output the image of the document without any intervention relating to the confirmation in the case in which the designated size of the output is determined to be coincident with the most suitable size of the output.

11. The image processing apparatus according to claim 9, wherein, in a case in which a setting of an aggregation function is designated for the document, the circuitry is further configured to determine whether to perform the notification based on a size of output divided according to designation of the setting of the aggregation function.

12. The image processing apparatus according to claim 9, wherein, the notification includes a message prompting for confirmation on an occurrence of a partial omission of the image or a blank space, and information on a predefined resolution method.

13. The image processing apparatus according to claim 9, wherein, the image processing apparatus has at least one of a copying function to form an image obtained by reading a document, a scanning function to read a document and output a read image of the document as an image file, a printing function to form an image of a document, a facsimile communication function to transmit an image of a document.

14. A non-transitory recording medium storing a plurality of program codes which, when executed by one or more processors, causes the one or more processors to perform a method, the method comprising:

storing a minimum size of output that an image processing apparatus can output;

determining a size of a document;

outputting an image of the document in a case in which the size of the document is determined to be smaller than the minimum size of the output;

outputting a notification prompting for confirmation in a case in which the size of the document is determined not to be smaller than the minimum size of the output;

receiving a setting of a designated size of output designated by a user; and in the case in which the size of the document is determined not to be smaller than the minimum size of the output, outputting the notification based on a determination that a partial omission of the image or a blank space occurs based on at least the designated size of the output and the size of the document.

* * * * *